(12) United States Patent
Kjær et al.

(10) Patent No.: US 12,336,545 B2
(45) Date of Patent: Jun. 24, 2025

(54) FISH FILLETING MACHINE FOR PROCESSING FISH SUCH AS TILAPIA

(71) Applicant: MAREL SALMON A/S, Stovring (DK)

(72) Inventors: Anders Kjær, Aabybro (DK); Bjarne Kjeld Jakobsen, Nibe (DK); Thomas Norlund Lanzky, Aalborg (DK)

(73) Assignee: MAREL SALMON A/S, Stovring (DK)

( * ) Notice: Subject to any disclaimer, the term of this patent is extended or adjusted under 35 U.S.C. 154(b) by 233 days.

(21) Appl. No.: 17/789,884

(22) PCT Filed: Jan. 14, 2021

(86) PCT No.: PCT/EP2021/050723
§ 371 (c)(1),
(2) Date: Jun. 29, 2022

(87) PCT Pub. No.: WO2021/144378
PCT Pub. Date: Jul. 22, 2021

(65) Prior Publication Data
US 2023/0051159 A1    Feb. 16, 2023

(30) Foreign Application Priority Data
Jan. 14, 2020    (EP) .................................... 20151698

(51) Int. Cl.
*A22C 25/00*    (2006.01)
*A22C 25/16*    (2006.01)

(52) U.S. Cl.
CPC ................... *A22C 25/16* (2013.01)

(58) Field of Classification Search
CPC ..... A22C 25/16; A22C 25/163; A22C 25/166; A22C 25/18
(Continued)

(56) References Cited

U.S. PATENT DOCUMENTS

| | | | |
|---|---|---|---|
| 3,309,730 | A | 3/1967 | Michael |
| 4,008,509 | A | 2/1977 | Braeger et al. |

(Continued)

FOREIGN PATENT DOCUMENTS

| | | | |
|---|---|---|---|
| CN | 103636731 A | 3/2014 | |
| CN | 203789016 U | 8/2014 | |

(Continued)

OTHER PUBLICATIONS

Office Action from Chinese Application No. 202180008591.5, Nov. 10, 2022.
(Continued)

*Primary Examiner* — Richard T Price, Jr.
(74) *Attorney, Agent, or Firm* — Workman Nydegger (57) ABSTRACT

A fish filleting machine for cutting fillets from fish includes a first set of cutting blades and a second set of cutting blades located along a feed-line and each configured for cutting the dorsal or the ventral part of the fish by cutting towards and along the vertebral column. The first set of cutting blades and the second set of cutting blades are located in relation to each other such that the first set of cutting blades and the second set of cutting blades are not located directly horizontally above and below each other, and/or cutting parts of the first set of cutting blades and the second set of cutting blades cutting towards the vertebral column are not located directly horizontally above and below each other.

15 Claims, 9 Drawing Sheets

(58) Field of Classification Search
USPC .......................................................... 452/149
See application file for complete search history.

(56) References Cited

U.S. PATENT DOCUMENTS

| | | | | |
|---|---|---|---|---|
| 4,037,294 A | * | 7/1977 | Cowie ................... | A22C 25/166 |
| | | | | 452/136 |
| 4,151,629 A | * | 5/1979 | Braeger ................. | A22C 25/16 |
| | | | | 452/136 |
| 4,236,275 A | * | 12/1980 | Westerdahl ............ | A22C 25/16 |
| | | | | 452/179 |
| 4,534,085 A | | 8/1985 | Stewart | |
| 5,149,297 A | * | 9/1992 | Braeger ................. | A22C 25/16 |
| | | | | 452/162 |
| 5,871,395 A | * | 2/1999 | Grabau ................. | A22C 25/166 |
| | | | | 452/161 |
| 6,200,211 B1 | * | 3/2001 | Braeger ................. | A22C 25/16 |
| | | | | 452/161 |
| 6,280,313 B1 | * | 8/2001 | Braeger ................. | A22C 25/16 |
| | | | | 452/161 |
| 7,090,574 B2 | | 8/2006 | Braeger et al. | |
| 8,814,637 B2 | | 8/2014 | Jurs et al. | |
| 2013/0059514 A1 | | 3/2013 | Jurs et al. | |

FOREIGN PATENT DOCUMENTS

| | | |
|---|---|---|
| CN | 104996537 A | 10/2015 |
| CN | 107361116 A | 11/2017 |
| DE | 2460447 A1 | 7/1976 |
| DE | 102010022055 A1 | 12/2011 |
| EP | 2460411 A1 | 6/2012 |
| EP | 2519110 B1 | 11/2013 |
| RU | 94017667 A | 5/1996 |
| RU | 2626138 C2 | 7/2017 |
| RU | 2015157166 A | 7/2017 |
| WO | 2012062331 A1 | 5/2012 |
| WO | 2019120410 A1 | 6/2019 |

OTHER PUBLICATIONS

Search Report from Chinese Application No. 202180008591.5, Nov. 4, 2022.
Extended European Search Report from corresponding EP Application No. 20151698.6, Jul. 1, 2020.
International Search Report from corresponding PCT Application No. PCT/EP2021/050723, Apr. 22, 2021.

* cited by examiner

FISH FILLETING MACHINE FOR PROCESSING FISH SUCH AS TILAPIA

FIELD OF THE INVENTION

The present invention relates to a fish filleting machine, in particular a machine for filleting edible fish from the family Cichlidae, such as fish in the group commonly called Tilapia.

BACKGROUND OF THE INVENTION

Fish processing, such as filleting, is a highly automated process. Knives or saws cut on each side of the fish skeleton to obtain the fillets.

Different species of fish have different anatomical structures. Such differences may comprise difference in shape, size, thickness and hardness of the fish bones, also differences of the fins occur in respect of location and size, as well as shape, thickness and hardness of the fish bones in the fins.

U.S. Pat. No. 7,090,574 describes a device for filleting Tilapia. Fish were beheaded, slaughtered and had their ventral cavity opened. Cuts were made in the dorsal region and on the ventral side in the caudal region for exposing the dorsal spokes and ventral spokes, respectively. Then, separating cuts were made over the vertebral column connecting the dorsal and ventral cuts. Before peeling separation in the region of the ventral cavity, the ventral lobes were trimmed by separation of the ends of their ventral lobe portions projecting beyond the ribs. Peeling separation was completed by peeling cuts adapted to the rib contour.

The automated processes to cut e.g. fish fillets may differ in accordance to the species being processed due to the size and anatomical structure of the species. For some fish species the filleting machines present on the market today make cuts where too much meat stay at the skeleton. If the fish could be cut such that less meat is left on the skeleton and more meat are on the fish fillet, this will increase the income for the producer.

The invention described herein is related to a fish filleting machine suitable for filleting fish e.g. Cichlidae fish, such as Tilapia species. The filleting machine is constructed to increase the amount of fish meat in the obtained fillets, and thus reducing the amount of fish meat on the skeleton.

DESCRIPTION OF THE INVENTION

The present invention relates to a fish filleting machine for cutting fillets from fish, the machine comprising a first set of cutting blades and a second set of cutting blades located along a feed-line and each configured for cutting the dorsal or the ventral part of the fish by cutting towards and along the vertebral column, and wherein the first set of cutting blades and the second set of cutting blades are located in relation to each other such that the first set of cutting blades and the second set of cutting blades are not located directly horizontally above and below each other, and/or cutting parts of the first set of cutting blades and the second set of cutting blades cutting towards the vertebral column are not located directly horizontally above and below each other.

Thus, in a first aspect the invention relates to a fish filleting machine for cutting fillets from fish, the machine comprising:
A feed-line for feeding fish through the machine,
A first set of cutting blades for cutting the dorsal or the ventral part of the fish by cutting towards and along the vertebral column,
A second set of cutting blades for cutting the dorsal or the ventral part of the fish not cut by the first set of cutting blades, by cutting towards and along the vertebral column,
wherein
The first set of cutting blades and second set of cutting blades are located along the feed-line, and
One of the first set of cutting blades or second set of cutting blades are located mainly above a horizontal plane extending through the filleting machine, and
The other of the first set of cutting blades and the second set of cutting blades are located mainly below the horizontal plane extending through the filleting machine,
and wherein
the first set of cutting blades and the second set of cutting blades are located in relation to each other such that
the first set of cutting blades and the second set of cutting blades are not located directly above and below each other, and
the first set of cutting blades and the second set of cutting blades are located with a distance of less than 45 mm between the cutting blades of the first set of cutting blades and the cutting blades of the second set of cutting blades.

By the displacement of the first set of cutting blades and the second set of cutting blades i.e. these sets of cutting blades are displaced according to each other along a horizontal line, the cutting parts of the first set of cutting blades and the second set of cutting blades cutting towards the vertebral column are preferably not located directly horizontally above and below each other.

The first set of cutting blades and second set of cutting blades may each have a rotational axis, and which are parallel to each other in one horizontal dimension, but which are displaced to a horizontal line in a second dimension and also displaced to a vertical line in a third dimension.

In Tilapia the vertebral column is relatively large, more or less s-shaped when observed along its length and it is very hard. It is therefore very difficult to cut the fish meat close to both the neural spine and hemal spine as well as close to the vertebral column. The invention described herein increases the amount of meat harvested during filleting of e.g. Tilapia fish by cutting closer to the skeleton of the fish than prior art fish filleting machines.

The first set of cutting blades and second set of cutting blades are located relative to each other such that a fish to be cut by these cutting blades cannot enter in a straight line between the sets of cutting blades. The first and second sets of cutting blades each cut either the dorsal or the ventral part of the fish by cutting towards and along the vertebral column, hereby the fish will twist in between the first and second set of cutting blades during the cutting. When cutting Tilapia with a slight s-shaped vertebral column the position of the first and second sets of cutting blades secure the meat is cut entirely to the vertebral column besides the neural spines and the hemal spines.

In an embodiment both the first set of cutting blades and the second set of cutting blades may be located with a part of the cutting blades overlapping the horizontal plane extending through the filleting machine.

Preferably the first set of cutting blades and the second set of cutting blades are located with a distance of less than 45 mm between the cutting blades of the first set of cutting blades and the cutting blades of the second set of cutting blades. The distance is preferably determined between blades cutting the same side of the fish i.e. the right or left side of the fish. The distance between cutting blades from the first set of cutting blades and the second set of cutting should be determined according to the size of the vertebral column of fish to be filleted. The distance between the blades can be between 10 and 40 mm, such as between 15 and 35 mm, e.g. between 20 and 30 mm, such as between 20 and 25 mm. The distance can also be described as being less than 40 mm, such as less than 35 mm, e.g. less than 30 mm, e.g. less than 25 mm, such as less than 20 mm, e.g. less than 15 mm. This distance is preferably large when filleting large fish, and smaller when filleting smaller fish. For Tilapia fish of a weight of about 500-1400 g fresh weight, the described distance may be e.g. about 23 mm when filleting the fish.

The two cutting blades making up the first set of cutting blades and the second set of cutting blades, respectively, may be placed at an angle according to each other. At cutting blade positions located towards incoming fish to be filleting or at cutting blade position being the lowest position of the first set of cutting blade and the highest position of the cutting blade of the second set of cutting blade i.e. blade positions towards the feed-line, the two cutting blades in a set may be placed closer towards each other such that the distance between the blades are smaller at these positions than in other positions along the cutting blades. For the two cutting blades making up the first set of cutting blades, the blades may be placed at an angle according to each other such that the distance between the blades are smaller at the position corresponding to the lowest point and/or at the position located towards the incoming fish. In a similar manner the two cutting blades making up the second set of cutting blades may be placed at an angle according to each other such that the distance between the blades is smaller at the position corresponding to the highest point and/or at the position located towards the incoming fish. In case the cutting blades of a set of cutting blades are placed at an angle i.e. towards each other both in the lowest position for the first set of cutting blades and at the highest position for the second set of cutting blades and in the position located towards incoming fish then also the blade part between these positions will be closer to each other. By placing the cutting blades of a set of cutting blades at an angle can increase the cutting process e.g. by increasing the amount of harvested meat.

The machine may further comprise a third set of cutting blades for cutting the dorsal part of the fish along the vertebral column and next to the base of the neural spines.

The third set of cutting blades cut the meat along the vertebral column and especially at the dorsal part next to the base of the neural spines i.e. where the neural spines are connected to the vertebral column. Some fish species such as Tilapia have a rather broad vertebral column, and by cutting with the third set of cutting blades it is possible to increase the meat harvest when compared to performing a cut only on the lateral side of the vertebral column and thus not cutting close to the base part of the neural spines.

The machine may further comprise a fourth set of cutting blades for cutting along the vertebral column of the fish, at the lateral sides of the vertebral column.

The fourth set of cutting blades perform the last cut for cutting the fillets from the skeleton. The fourth set of cutting blades preferably cuts from one end to the other end of the vertebral column while the fish is transported along this set of cutting blades. Preferably guides keep holding the fillets and the skeleton in their relative position throughout all the cutting processes.

The fish filleting machine may comprise:
An infeed for feeding fish into the filleting machine, A first set of cutting blades for cutting the dorsal or the ventral part of the fish by cutting towards and along the vertebral column, A second set of cutting blades for cutting the dorsal or the ventral part of the fish not cut by the first cutter, by cutting towards and along the vertebral column, A third set of cutting blades for cutting the dorsal part of the fish along the vertebral column and next to the base of the dorsal spokes, and A fourth set of cutting blades for cutting along the vertebral column of the fish, at the lateral sides of the vertebral column, and Wherein the first and second sets of cutting blades may be located in any order or above and below each other in respect of a substantially horizontal plane extending through the filleting machine, and preferably not directly above each other.

In the machine the first set of cutting blades and the second set of cutting blades are preferably each a set of two circular cutting blades located with one cutting blade on each side of the plane extending through the filleting machine. The first set of cutting blades and second set of cutting blades each has a rotational axis which is parallel to each other in one horizontal dimension and which are displaced to a horizontal line in a second dimension and also displaced to a vertical line in a third dimension.

The horizontal plane extending through the filleting machine may correspond substantially to the position of the vertebral column when a fish is being processed in the machine. In case the vertebral column of the fish is s-shaped, the plane extending through the filleting machine may correspond substantially to an average of the position of the vertebral column during the processing. The plane extending through the filleting machine may also correspond to a plane between guides, such as a transport bands, contacting the fish skin on their lateral side and guiding the fish through the filleting machine.

In a preferred embodiment the circular cutting blades making up the first set of cutting blades and the circular cutting blades making up the second set of cutting blades have substantially similar diameter. This diameter may be e.g. between 7 and 16 cm. The set of circular cutting blades representing the first set of cutting blades and second set of cutting blades, each has a centre point. The centre point of the first cutting blades and the centre point of the second cutting blades are preferably located in relation to each other in the machine such that a horizontal line or a vertical line cannot enter through both centre points of the first and second cutting blades.

A distance between cutting parts of the first set of cutting blades and the second set of cutting blades may be about the height of the vertebral column of fish to be processed in the machine. This distance may also be larger than the height of the vertebral column. The distance may e.g. be between 8 and 20 mm such as for small fish, and larger for large fish.

In a further embodiment of the machine the third set of cutting blades may be a set of scraper cutters located with one cutting blade on each side of the plane extending through the filleting machine.

The scraper cutters cut along the vertebral column besides the base of the neural spines. Scraper cutters may also be located to cut along the base of the hemal spines in the caudal region of the fish. A base part of the scraper cutters also functions as a guide for guiding the meat away from the skeleton before the fourth set of cutting blades are to cut along the vertical sides of the vertebral column.

The fourth set of cutting blades may be a set of two band saws located with one band saw on each side of the plane extending through the filleting machine. Preferably the cutting part of the band saws and the plane extending through the filleting machine are located perpendicular to each other.

Guides for guiding meat away from the skeleton may be located in the cutting machine right after at least a part of the fish has passed the first set of cutting blades, such that the guides may become entered in between the meat cut off by the set of cutting blades and the fish skeleton from where the meat is cut off. Guides may also be located right after the fish has passed the second set of cutting means and the third set of cutting means. One guide may be located after each cutting blade. The guides may thus be located in the machine corresponding to the position of the dorsal and ventral part of the fish to guide the cut off meat away from the skeleton without pulling off the meat still in contact with the vertebral column. Hereby the fourth set of cutting blades such as a band saw located on each side of the vertebral column can cut off the meat along the ventral sides of the vertebral column, without cutting further into the fillets.

The first set of cutting blades may be located before the second set of cutting blades. With 'located before' is meant that a fish to be cut is directed to the first set of cutting blades and becomes at least partly cut by the first set of cutting blades before the second set of cutting blades engages with the fish and starts cutting into the fish. The first set of cutting blades may be located substantially higher than the second set of cutting blades in relation to the plane extending through the machine, or the first set of cutting blades may be located lower than the second set of cutting blades.

Preferably, the centre point of the first set of cutting blades is located higher than the centre point of the second set of cutting blades in respect of the plane extending through the filleting machine. Further preferred is when the centre point of the first set of cutting blades is located above the plane extending through the filleting machine, the centre point of the second set of cutting blades is located below the plane extending through the filleting machine and no horizontal or vertical line can enter through both centre points of the first and second set of cutting blades.

In the machine the first set of cutting blades may be for cutting the ventral part of the fish, and the second set of cutting blades may be for cutting the dorsal part of the fish.

Preferably the fish to be processed in the machine is fed into the feed-line such that it enters the machine head part first i.e. tail last. Though the fish may also be fed tail first into the feed-line. Preferably the fish are de-headed when fed into the feed-line.

The feed-line starting with an in-feed and continuing through the machine may be designed with a slide at an in-feed station. The slide may have side support securing an upright position of the fish and conveyor means in the bottom part conveying the fish into the machine. Fish are easily placed into the slide in an upright position with the dorsal part downward or upward according to how the machine is set up to cut the fish. Preferably the fish are fed into the feed-line with the ventral side up and dorsal side down. The feed-line may at a position where the side support ends continue with a set of fingers to align the position of the fish to secure a vertical position before a transport band engages with the fish at their lateral sides. The side supports of the in-feed may have a height of e.g. about ½ to ¾ the height of fish to be processed and the slide may have a width securing the fish can easily enter into the slide. Loading fish in the in-feed may be a manual process. The conveyor means in the bottom part of the slide may be upright dividing walls across the width of the slide. The dividing walls should have a height capable of engaging with a fish located in the in-feed slide and capable of pushing the fish forward in the feed-line and into the machine.

In the machine the blades of the first set of cutting blades and/or the second set of cutting blades may be positioned with an angle according to each other, such that the distance between the cutting blades may be narrower:
 a) in a first region which is substantially parallel to the plane extending through the filleting machine and which is facing a fish to be cut by the first set of cutting blades and/or the second set of cutting blades,
 b) in a second region which is located towards the vertebral column of a fish being processed, and
 c) in a third region located between the first region and the second region.

The knife blades of a set of cutting blades can hereby be said to be angled towards each other in two directions, one direction is substantially parallel to the vertebral column or to an average line of the s-shaped vertebral column, and the other direction is towards the vertebral column. In other words the knife blades of a set of cutting blades can be closer to each other in the region perpendicular to the fish transport direction, which is also towards the vertebral column during the cutting, and in the region parallel to the fish transport direction and thus facing the fish transported towards the set of cutting blades.

By making an angle between the knife blades of the first and/or second set of cutting blades, it is possible to cut off the meat closer to the neural spines and hereby increasing the meat harvested from the dorsal part of the fish. In the ventral part of the fish, angled knife blades ensure cuts closer to the hemal spines in the caudal region of the fish. Hereby the meat harvested in the ventral part of the fish is also increased when compared to cutting with non-angled knife blades.

The first, second, third and fourth set of cutting blades may be fixed mounted. By fixed mounted is meant the knife blades of the set of cutting blades are only moving or running to perform the cutting into the fish during the cutting. Though the cutting blades are fixed mounted it may be possible to adjust their position to the size of fish to be cut. Such an adjustment is preferably performed before cutting a batch of fish.

The machine may further comprise a set of fin-cutting blades for cutting away the pelvic fin from a fish to be processed.

The pelvic fin may include rather hard rays, and it may be beneficial to remove the pelvic fin before a fish reaches the position of the first or second set of cutting blades. The pelvic fin may be removed when the fish is de-headed and the viscera is removed. Though the pelvic fin may still be on the fish after de-heading and removal of viscera, especially if the skin at the ventral side of the fish is not cut to remove the viscera.

Preferably a set of fin-cutting blades for cutting away the pelvic fin is located before the fish reaches the first or second set of cutting blades that is to cut the ventral part of the fish.

A set of fin-cutting blades may be movable mounted and configured to move towards a fish to cut through the fish skin along and on both sides of the pelvic fin, and to move away from the fish again after performing the cut.

To secure the set of fin-cutting blades only cuts in the ventral skin to remove the pelvic fin, it may be preferred the set of fin-cutting blades are movable mounted e.g. on an arm such that the set of fin-cutting blades engages with the ventral part of the fish to cut off the pelvic fin, and then the arm moves the set of fin-cutting blades away from the fish to avoid further cutting into the fish.

In an aspect the filleting machine may comprise a pelvic fin cutter instead of a set of fin-cutting blades for cutting away the pelvic fins. The pelvic fin cutter may be for cutting through the connection between two pelvic fins, as this connection is rather strong. The pelvic fin cutter hereby does not cut away the pelvic fin(s) from the fish but splits the fin or cuts a connection between two pelvic fins of a fish.

The pelvic fin cutter is preferably located upstream of the first set of cutting blades, and may comprise at least one cutting edge, such as a single circular cutting blade with an outer cutting edge, for splitting a pelvic fin of a fish or for cutting a connection between two pelvic fins of a fish.

The filleting machine may further comprise an actuator in communication with the pelvic fin cutter, where the actuator is capable of locating and de-locating at least a part of the pelvic fin cutter in a cutting position. The filleting machine may also comprise a controller for controlling the actuator, such as for controlling the position of the pelvic fin cutter relative to the location of a fish to be cut, and such that the pelvic fin cutter is activated and located to cut a pelvic fin or a connection between pelvic fins of a fish transported along the feed-line and passing the pelvic fin cutter.

A second aspect of the invention relates to a method of cutting fish in a fish filleting machine, such as in a fish filleting machine described herein, the method may comprise the steps of
  a. Obtaining fish which are decapitated and viscera is removed,
  b. Feeding the fish to a feed-line of a filleting machine,
  c. Cutting by a first set of cutting blades along the dorsal or ventral part of the fish, by cutting towards and along the vertebral column,
  d. Cutting by a second set of cutting blades along the dorsal or ventral part of the fish not cut by the first set of cutting blades by cutting towards and along the vertebral column,
Wherein the first set of cutting blades and second set of cutting blades are located relatively to each other such that the fish during the cutting by at least the first set of cutting blades becomes twisted upwards or downwards.

The method may further comprise a step between step b and step c, where this step comprising splitting a pelvic fin of a fish or cutting a connection between two pelvic fins of a fish.

The method may further comprise that cutting in the fish by the first set of cutting blades is initiated before starting to cut in the fish by the second set of cutting blades.

With the first and second set of cutting blades the knife blades cut along neural spines and hemal spines and towards the vertebral column of the fish where the cutting blades each apply a force towards the vertebral column during the cutting. The vertebral column hereby becomes a controlling means for any twisting of the fish during the cutting by the first and second set of cutting blades, as the vertebral column of a fish is simultaneously though in different areas along the vertebral column affected by a force from below and a force from above. The first and second set of cutting blades are preferably located in relation to each other such that a fish cannot pass the first and second set of cutting blades without performing a twist in an upward and/or downward direction. The distance between the cutting parts of the two sets of cutting blades is preferably similar to or larger than the height of the vertebral column of fish to be processed.

In the method for cutting fish a further cut may be performed by cutting by a third set of cutting blades the dorsal part of the fish along the vertebral column and next to the base of the neural spines. This cut releases the fish meat from the vertebral column in the dorsal part of the fish. The cut may be performed by a scraper cutter.

The method may further comprise cutting by a fourth set of cutting blades along the vertebral column of the fish, at the lateral sides of the vertebral column. When cutting along the lateral sides of the vertebral column the fish meat is fully released from the neural spines, the hemal spines and at least from the vertebral column.

Preferably guides guide the cut off meat away from the fish skeleton during the cutting along the lateral sides of the vertebral column to secure as much meat harvest as possible.

In a preferred method the dorsal side of fish is cut before the ventral side of fish is cut. In such a method cutting the ventral side of the fish may be initiated before cutting the dorsal side of the fish is finished. Thus, cutting the ventral side of the fish and the dorsal side of the fish is preferably not initiated simultaneously. Though, cutting part of the dorsal side and part of the ventral side of a fish may be performed simultaneously.

In the method of cutting fish, during the cutting of the ventral side of the fish, the ribs may be cut off the vertebral column. Hereby the ribs are located on the meat part and may be removed in a process following filleting the fish. If cutting Tilapia, a membrane located between the swim bladder and the abdomen may also be cut, such that part of this membrane may be present on the fillets and also removed in a process following filleting the fish.

In the method when cutting by the first and second set of cutting blades where the fish preferably is twisted, the twisted fish are preferably during the cutting process re-twisted back to a lateral position substantially similar to before initiating the twisting. The forces applied to the vertebral column from the knife blades cutting towards the vertebral column may force the fish back to a lateral position. A transport band engaging with the skin on the lateral sides of the fish may engage with the fish throughout the cutting process though allowing the twisting of the fish when passing the first and second set of cutting blades.

In the method the pelvic fin may be cut off the fish prior to being cut by the first set of cutting blades.

In a preferred method the cuttings performed by the first and second sets of cutting blades can be performed with angled cutting blades in each set of cuttings blades and which cutting blades are narrowed towards each other in the cutting region of the blades.

In the method cutting by the third set of cutting blades may be by a scraper cutting to cut off the meat from the vertebral column along the neural spines.

The cut performed by the fourth set of cutting blades is preferably performed by a band saw and laterally to the vertebral column.

In summary, the method for filleting a fish may comprise the following steps:
  a) Obtaining a batch of fish, such as Tilapia fish, which are decapitated (de-headed), the ventral cavity is opened and the viscera etc. are removed.
  b) In an infeed each fish is located with the ventral side up, dorsal side down, and with the de-headed front part first into the cutting section of the machine (head part first).
  c) First cut is performed along the ventral part of the fish by cutting the ribs off the vertebral column and cutting along the hemal spines in the caudal part of the fish. The cuts can be performed by dual-knife blades located uppermost in relation to a horizontal plane through the machine, which horizontal plane the vertebral column of a fish substantially follows during the transport and cutting. The cut releases the ribs from the vertebral column, leaving the ribs on the meat which will make up the fillet.

d) Second cut is performed by cutting along the dorsal part and along the neural spines, where the cut is performed by dual-knife blades located lowermost in relation to the plane through the machine.

e) Third cut is performed as a scraper cut along the dorsal side of the vertebral column and next to the neural spines with a scraper knife, which after the location of the cut part, is configured to function as a guide by pushing the released meat parts in the dorsal part of the fish away from the neural spines.

f) Fourth cut is performed with dual band saws, which is pressed towards the vertebral columns to cut as close as possible along the vertebral column, while guides guide meat parts released by all other cuts outside the band saw.

g) The result obtained for each fish is two fillets each including ribs located along the ventral cavity, and a skeleton e.g. with the dorsal fin and the tail, if these were present when the fish was loaded into the machine.

The ribs etc located on the fillets may be removed manually or by machine to obtain fillets without ribs.

The method described has increased meat harvest. The percent of the total fish weight obtained by prior art filleting machines is about 28%, by hand filleting the harvest is 31-32% and by the machine and method described herein the meat harvest is 33-35%. If handling 100,000 kg fish each day, a 1% increased meat harvest corresponds to 1,000 kg more meat obtained per day. Thus, reducing the amount of low-price product and/or waste and simultaneously increasing the income. The machine may further reduce the numbers of workers by up to 8 compared to e.g. when filleting is performed only by hand.

It should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the invention will now be further described with reference to the drawings, in which.

DETAILED DESCRIPTION OF THE DRAWINGS

Figure 1A:
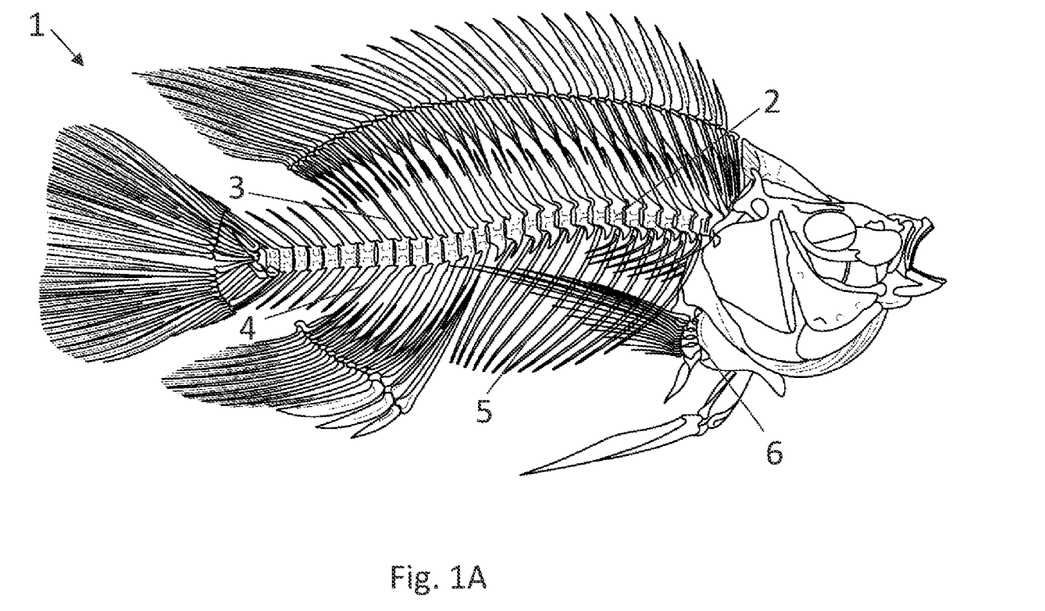
FIGS. 1A and 1B illustrate a fish skeleton from a Tilapia fish.

FIG. 1A illustrates a fish skeleton 1 from Tilapia. The vertebral column 2 is slightly s-shaped. Connected to the vertebral column 2 are the neural spines 3 at the dorsal part, and at the ventral part are the hemal spines 4 in the caudal region as well as the ribs 5 in the region where the viscera and the swim bladder have been located. The bones in the pelvic fin 6 are also shown.

Figure 1B:
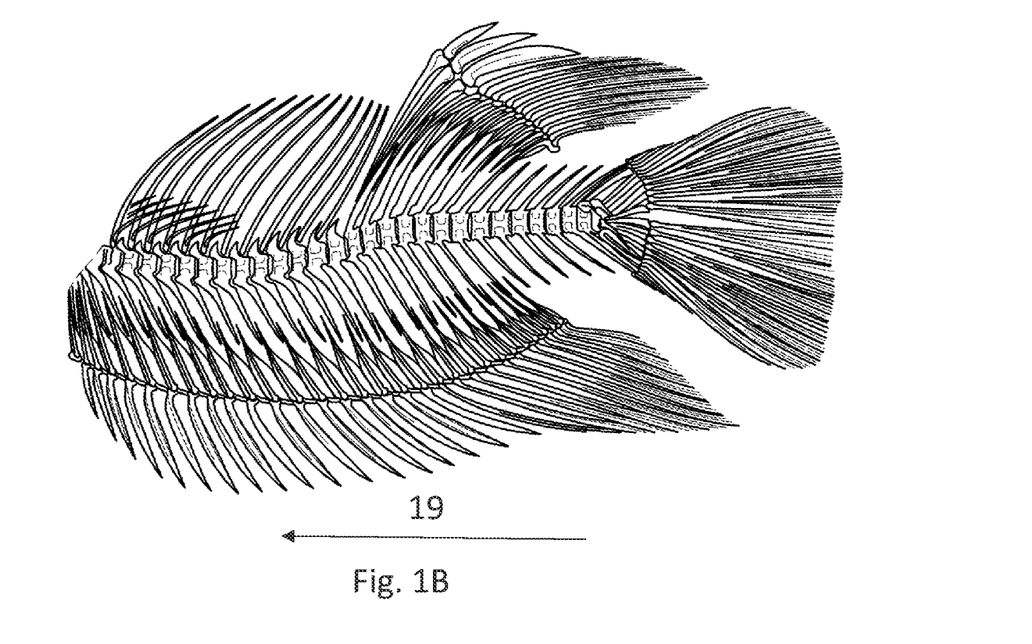

In FIG. 1B a preferred transport direction 19 of fish is illustrated when processed in a machine described herein, though here illustrated by a fish skeleton. The fish are decapitated, and the viscera is removed before being processed. The preferred transport direction 19 is head part first and dorsal side downward in the machine.

Figure 2A:
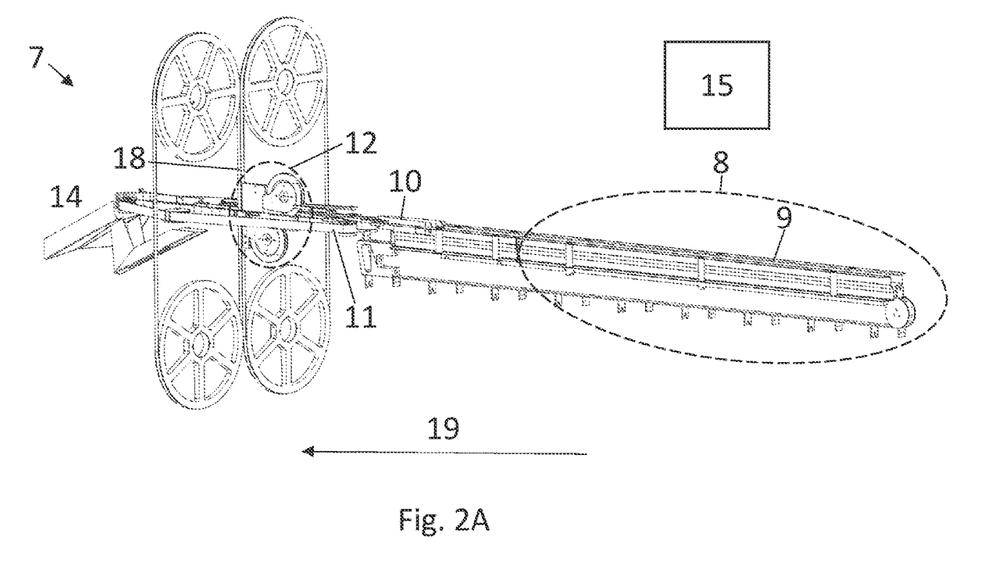
FIGS. 2A and 2B illustrate a side view of the food processing device without and with a pelvic fin cutter.

FIG. 2A illustrates a side view of a fish filleting machine 7 as described herein and indicate possible locations of different features in the filleting machine. Transport direction of fish is from right to left as illustrated by the arrow 19. The machine 7 comprises a loading area 8 for delivering fish to the machine by entering the fish into the in-feed 9 of the feed line. The fish are transported by slides to the fingers 10 where the fish are aligned and received and engaged by a transport band 11 transporting the fish to a cutting area 12 with a first, second and third set of cutting blades, and followed by a fourth set of cutting blades 18. Hereby the fish fillets with ribs are cut from the skeleton, and the two fish fillets and the skeleton from each fish can be retrieved at an outlet 14. Also illustrated is a monitor 15 giving information of the processes and being configured for a controller or abattoir worker to input data regarding fish to be cut.

Figure 2B:
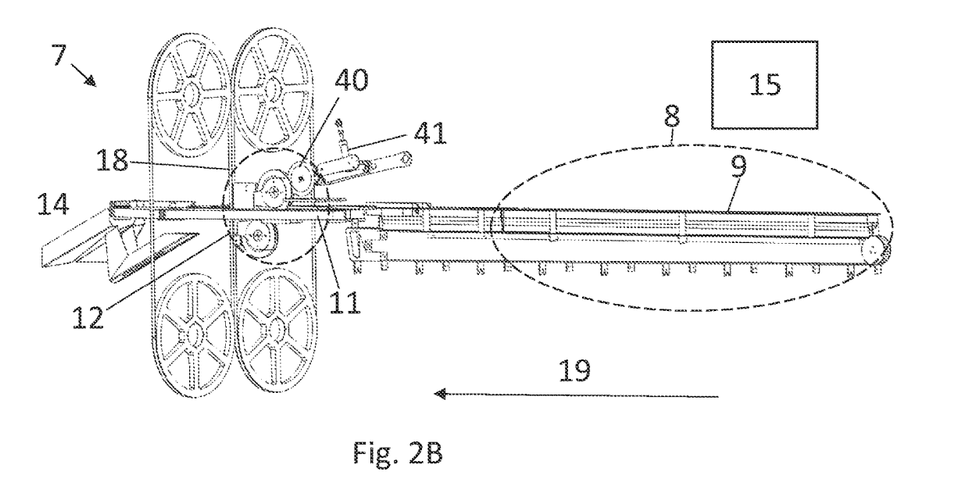

FIG. 2B illustrates a similar filleting machine 7 as in FIG. 2A with a pelvic fin cutter 40 located upstream of the first set of cutting blades. An actuator 41 connected to the pelvic fin cutter 40 is also illustrated. The actuator 41 is capable of moving the pelvic fin cutter 40 up-wards and down-wards to position and remove the pelvic fin cutter 40 in the cutting position. In the illustration the pelvic fin cutter 40 is in the cutting position. The pelvic fin cutter 40 is illustrated as one circular cutting blade, and this cutting blade is located such that the cutting line is between the cutting lines of the first set of cutting blades.

Figure 3:
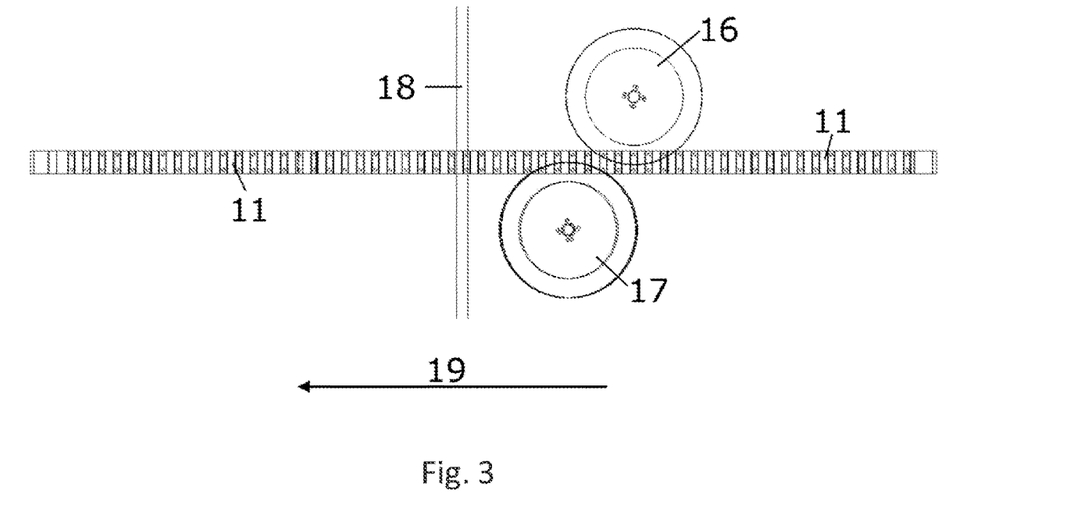
FIG. 3 illustrates a side view of the first, second and fourth set of cutting blades.

FIG. 3 illustrates a side view of the cutting area with a first set of cutting blades 16, a second set of cutting blades 17 and a fourth set of cutting blades 18. The transport band 11, which is a set of two transport bands, one on each side of the fish, transports the fish (not illustrated) to the first set of cutting blades 16 cutting the upper part of the fish, a second set of cutting blades 17 for cutting the lower part of the fish, and a fourth set of cutting blades 18 for cutting on the lateral sides of the ventral column of the fish and hereby releasing the fillets from the skeleton of the fish. The transport direction of fish is illustrated by the arrow 19. The first set of cutting blades 16 and the second set of cutting blades 17 are located in relation to each other such that a first cut is initiated in a first part e.g. the ventral part of the fish before a second cut is initiated in a second part e.g. the dorsal part of the fish.

Figure 4A:
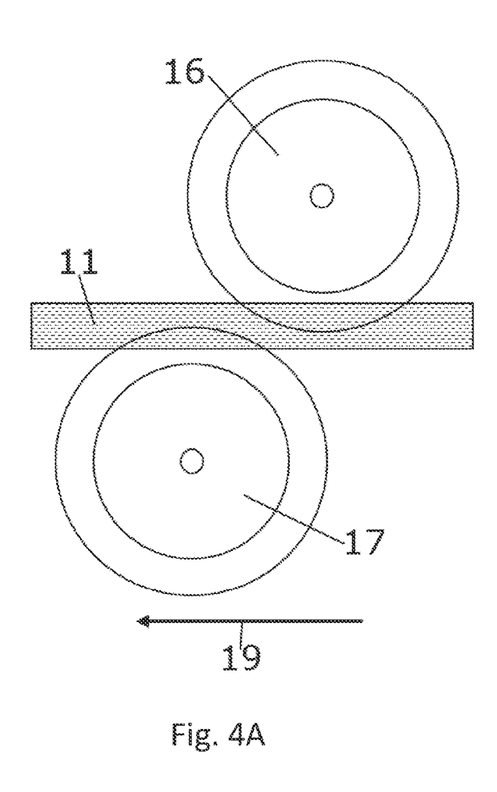
FIGS. 4A, 4B and 4C illustrate different locations of the first set of cutting blades and the second set of cutting blades.
Figure 4B:
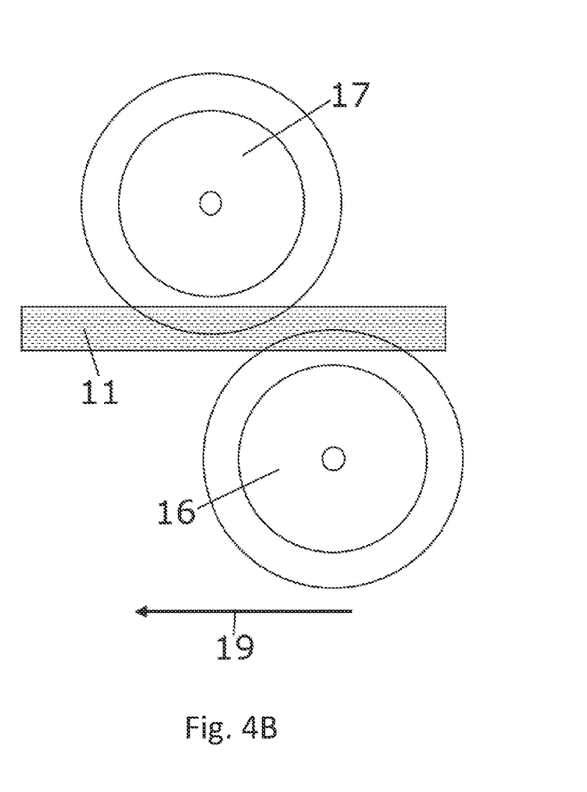

FIG. 4 illustrates possible locations of the first set of cutting blades 16 and second set of cutting blades 17 in relation to each other. The transport band 11 is illustrated, which transport fish in the direction illustrated by the arrow 19. In FIG. 4A the first set of cutting blades 16 is located mainly above a plane extending through the filleting machine and which plane may correspond to a plane along the transport band 11, and the second set of cutting blades 17 is located mainly below the plane extending through the filleting machine. In FIG. 4B the first set of cutting blades 16 is located mainly below the plane extending through the filleting machine, and the second set of cutting blades 17 is located mainly above the plane extending through the filleting machine.

Figure 4C:
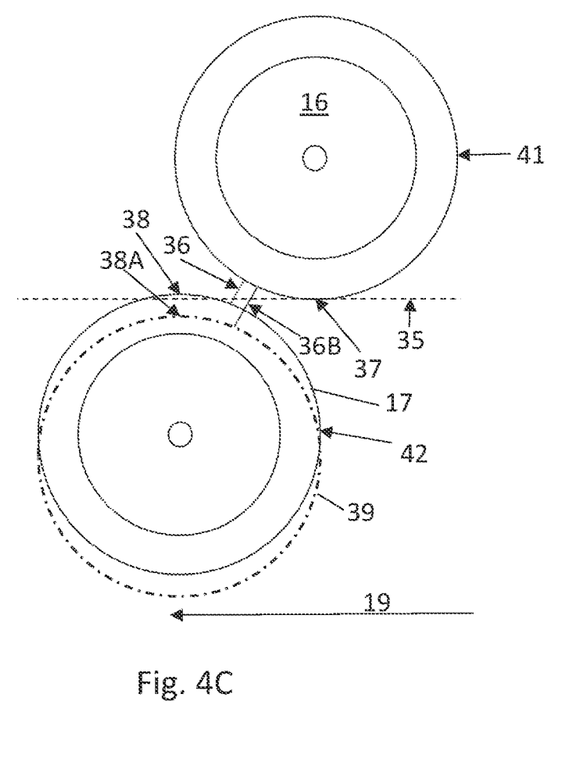

FIG. 4C illustrates one possible location of the first set of cutting blades 16 and the second set of cutting blades 17. One dotted line illustrates a horizontal plane 35 extending through the fillet machine and another dotted illustrates the shortest distance between the cutting blades 36 of the first set of cutting blades 16 and the second set of cutting blades 17. The point 37 illustrates the lowest point of the first set of cutting blades and the point 38 illustrates the highest point of the second set of cutting blades. Illustrated is also an outline of a second set of cutting blades 39 illustrating when the second set of cutting blades 17 are located with a distance below the horizontal plane 35. The highest point of the outline of the second set of cutting blades 39 is indicated by 38A. The shortest distance 36B illustrates the shortest distance between the first set of cutting blades 16 and the outline of the second set of cutting blades 39. The distance 36 or 36B is preferably less than 45 mm. This distance should be determined according to the size of the vertebral column of fish to be filleted such that the cutting is performed properly to the vertebral column. The distance 36, 36B between the blades can be between 10 and 40 mm, such as between 15 and 35 mm, e.g. between 20 and 30 mm, such as between 20 and 25 mm. The distance can also be described as being less than 40 mm, such as less than 35 mm, e.g. less than 30 mm, e.g. less than 25 mm. FIG. 4C also illustrates positions 41 and 42 of the cutting blades which are position of the first set of cutting blades and second set of cutting blades, respectively, and which positions are located towards incoming fish to be filleting. The arrow 19 indicates transport direction of fish. The two cutting blades making up the first set of cutting blades may be angled according to each other such that the distance between the blades are smaller at the position corresponding to the lowest point 37 and/or at the position 41. In a similar manner the two cutting blades making up the second set of cutting blades may be angled according to each other such that the distance between the blades are smaller at the position corresponding to the highest point 38 and/or at the position 42. In case the cutting blades are angled towards each other at point 37 and position 41 for the first set of cutting blades or at point 38 and position 42 for the second set of cutting blades, then the blade part between these positions will also be closer to each other.

Figure 5:
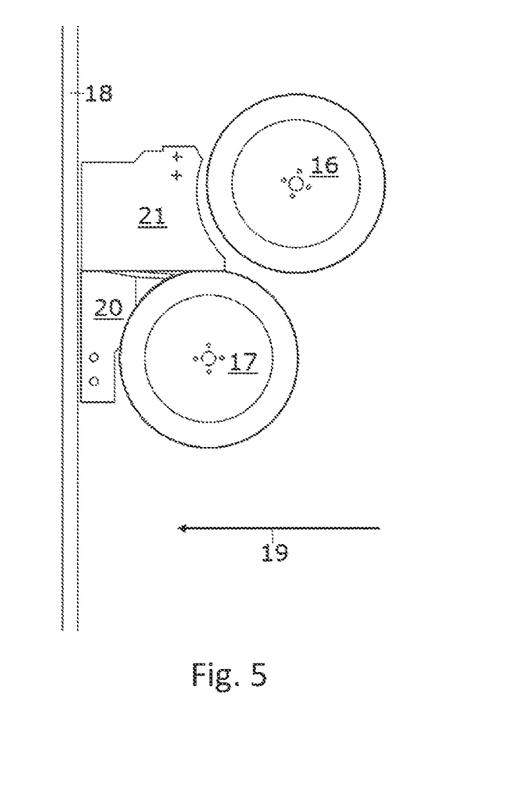
FIG. 5 illustrates a side view of the first, second, third and fourth set of cutting blades.

FIG. 5 illustrates a side view of the cutting area of the machine with a first set of cutting blades 16, a second set of cutting blades 17, a third set of cutting blades 20 and a fourth set of cutting blades 18. The first set of cutting blades 16, and the second set of cutting blades 17 are illustrated as round knife blades. The third set of cutting blades 20 is here a set of scraper knives each scraping the meat from the vertebral column on each side of the vertebral column. The third set of cutting blades 20 is also configured to act as a guide guiding the meat cut by the second set of cutting blades 17 and the third set of cutting blades 20 on the outer side of the fourth set of cutting blades 18. Also illustrated is a set of guides 21 configured to guide the meat cut from the skeleton by the first set of cutting blades 16 on the outer side of the fourth set of cutting blades 18, here illustrated as band saws running in a direction perpendicular to the fish transport direction illustrated by the arrow 19.

Figure 6:
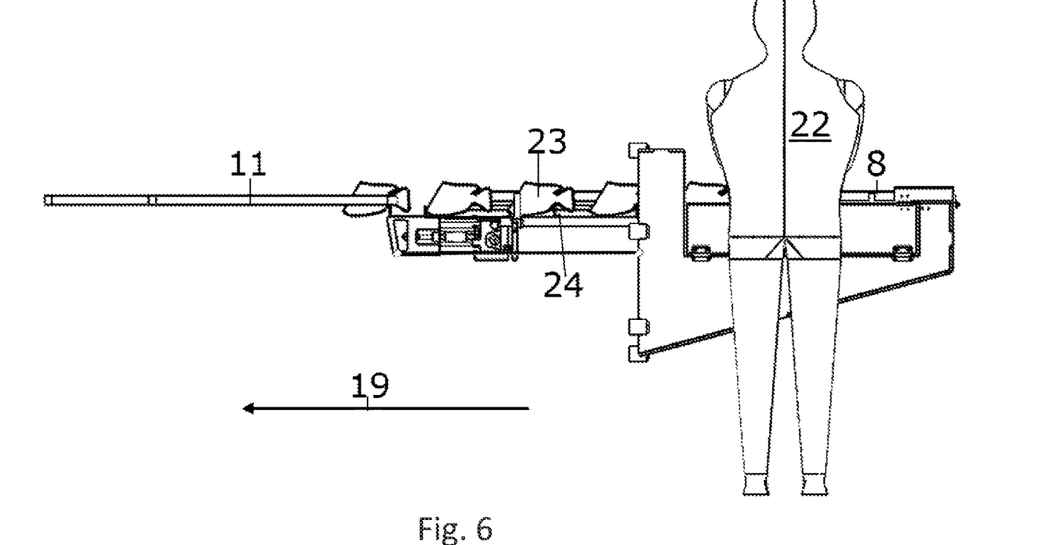
FIG. 6 illustrates a side view of the in-feed of the cutting machine.

FIG. 6 illustrates a side view of the in-feed and feed-line of the fish filleting machine. An abattoir worker 22 loads fish 23 into an in-feed comprising conveyor guides at a loading area 8. The fish are transported by slides 24 to alignment fingers where the fish are aligned and received and engaged by a transport band 11 transporting the fish towards and through a cutting area. The transport direction of fish is illustrated by the arrow 19.

Figure 7:
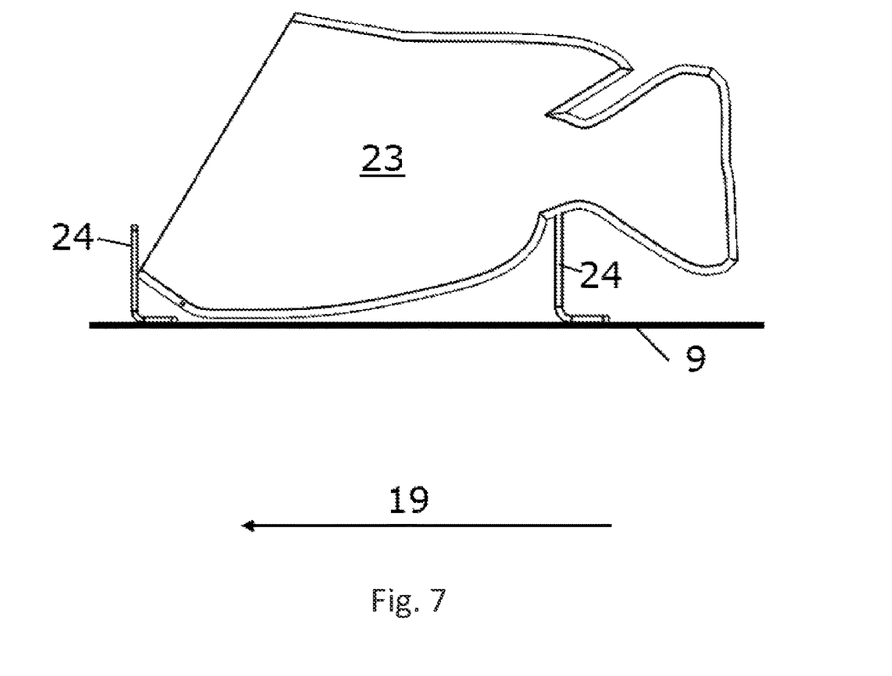
FIG. 7 illustrates a side view of a fish in the in-feed.

FIG. 7 illustrates a side view of a fish 23 in the in-feed 9. This is a preferred loading orientation of fish 23 in the in-feed 9, where the fish are transported by slides 24. Before loading into the machine, the fish 24 are decapitated and loaded with head-part first, dorsal part downward into the in-feed 9 and the ventral side up. The transport direction of fish is illustrated by the arrow 19.

Figure 8:
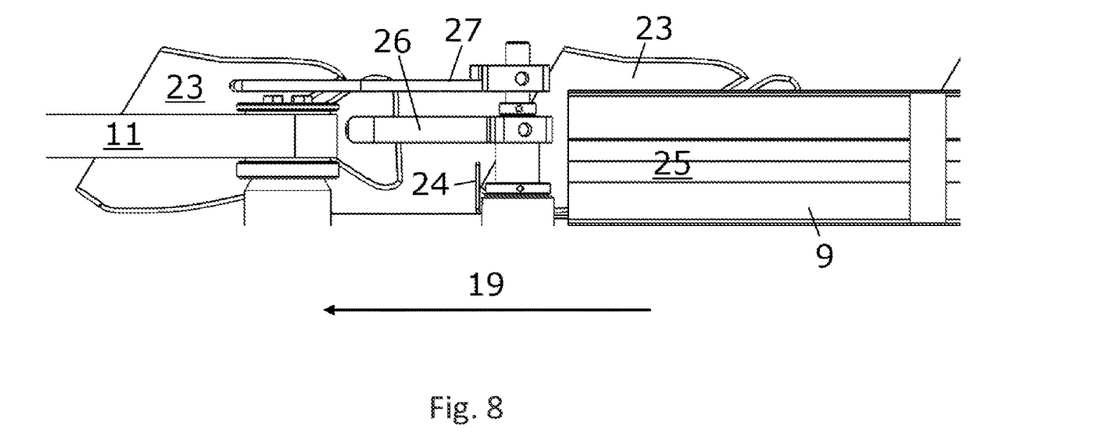
FIG. 8 illustrates a side view of the passage from the in-feed to the transport band, all being part of the feed-line.

FIG. 8 illustrates a side view of the passage from the in-feed 9 to the transport band 11, all being part of the feed-line through the fish filleting machine 7. Fish 23 are transported in the in-feed 9 with side support 25 at both sides and slides 24 in the bottom part of the in-feed 9. Here a slide 24 is illustrated outside the side support 25. From the in-feed 9 the fish are transported to a transport band 11 such that when the fish 23 leaves the in-feed 9 and before being engaged by the transport band 11, a set of fingers on each side of the fish 23 and comprising short fingers 26 and long fingers 27 secure the fish 23 are properly aligned i.e. vertically located. The set of transport bands 11 have spikes configured to engage with the fish skin, such that the fish 23 are properly held during the cutting.

Figure 9:
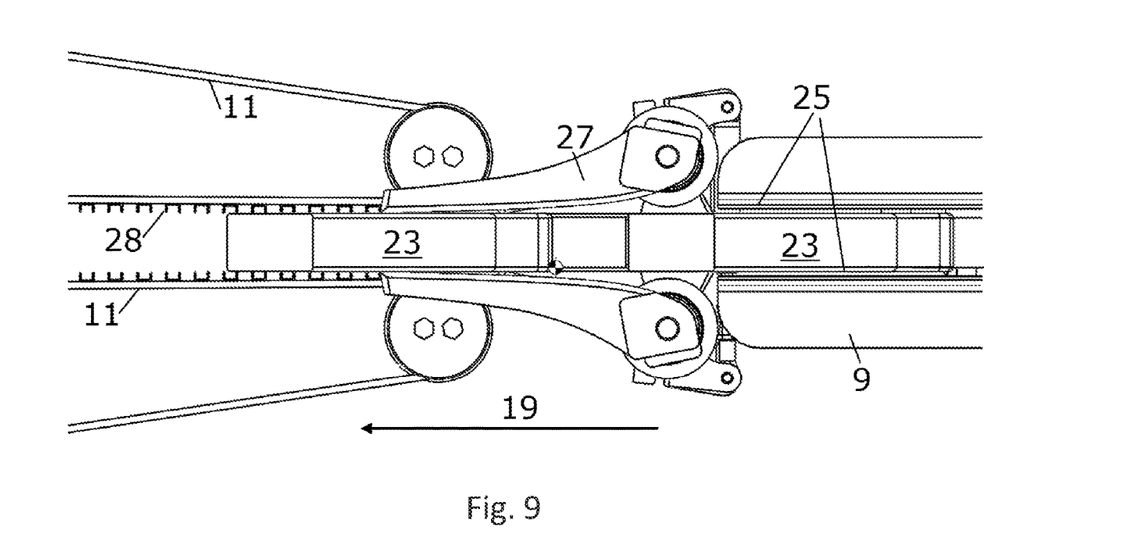
FIG. 9 illustrates a top view of the passage from the in-feed to the transport band.

FIG. 9 illustrates a top view of the passage from the in-feed 9 to the transport band of the feed-line. Fish 23 are transported in the in-feed 9 with side support 25 on both sides. From the in-feed 9 the fish are transported to a transport band 11 such that when the fish 23 leaves the in-feed 9 and before being engaged by the transport band 11, a set of fingers 27 on each side of the fish 23 secure the fish 23 are properly aligned i.e. vertically located. The set of transport bands 11 have spikes 28 configured to engage with the fish skin, such that the fish 23 are properly held during the cutting.

Figure 10A:
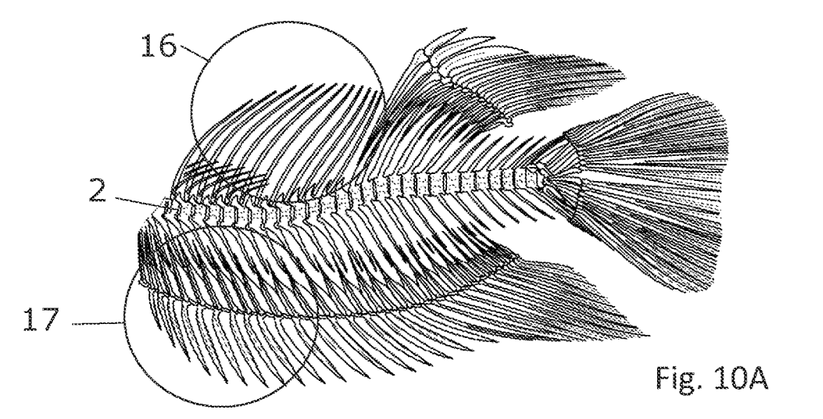
FIGS. 10A, 10B, 10C and 10D illustrate twisting of a fish when cut by the first and second set of cutting blades.
Figure 10B:
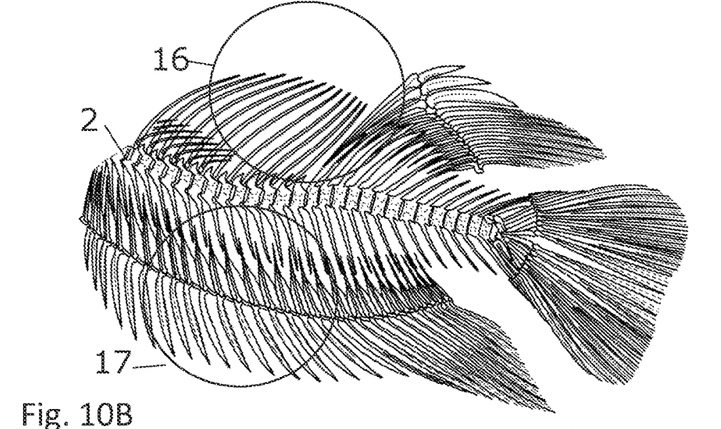
Figure 10C:
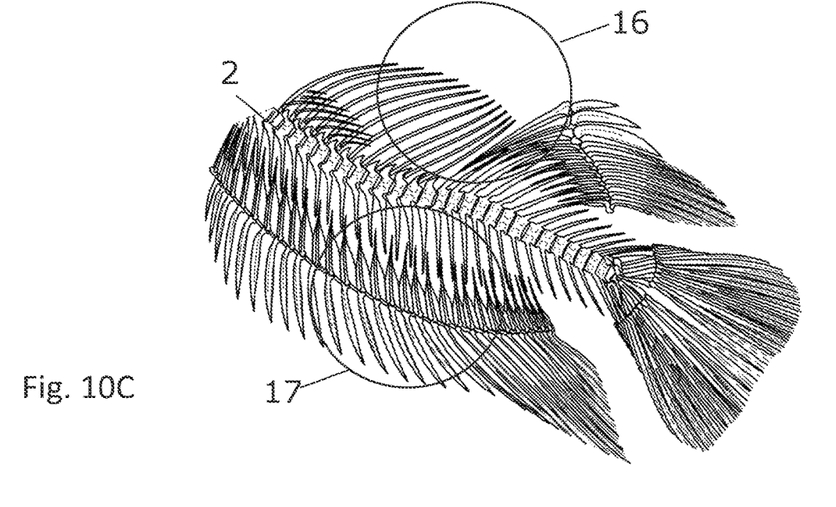
Figure 10D:
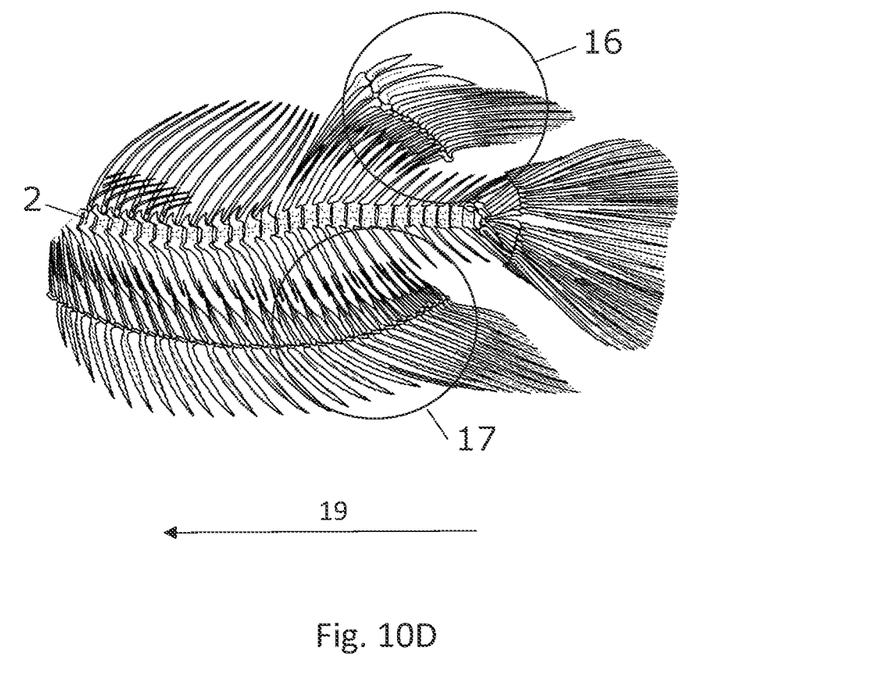

FIG. 10A-10D illustrate twisting of a fish 23 during a cutting process, though here illustrated by a skeleton to show the locations of the first set of cutting blades 16, second set of cutting blades 17 and the vertebral column 2. The fish has an s-shaped vertebral column 2, such as in a Tilapia. The skeleton with a slightly s-shaped ventral column 2 of a fish 23 is shown to illustrate the twisting of the fish 23 when being cut, and where the twisting may be due to forces between on the one hand the ventral column 2 and on the other hand the first set of cutting blades 16 and the second set of cutting blades 17. In FIG. 10A the ventral part of the fish 23 is cut by the first set of cutting blades 16 and the dorsal part of the fish 23 is cut by the second set of cutting blades 17 in a region where the ventral column 2 is straight. In FIG. 10B the first set of cutting blades 16 is in contact with an area of the ventral column 2 which is turning up. The forces by the first set of cutting blades 16 forces the fish to twist upwardly with the head-part of the fish. The twisting of the fish continues in FIG. 10C where both the first set of cutting blades 16 and the second set of cutting blades 17 are cutting in the middle part along the ventral column 2. In FIG. 10D it is illustrated how the fish is twisted downward again when the caudal region of the fish is in contact with the first set of cutting blades 16 and the second set of cutting blades 17. The transport direction of fish is illustrated by the arrow 19. In the FIGS. 10A-10D the position of the first set of cutting blades 16 and second set of cutting blades 17 is much like illustrated in FIG. 4C by the first set of cutting blades 16 and the outline of the second set of cutting blades 39 i.e. the second set of cutting blades has a distance to the horizontal plane 35 i.e. not crossing the horizontal plane. If the second set of cutting blades 17 was positioned as illustrated in FIG. 4C i.e. with the highest point of the second set of cutting blades 38 above the horizontal plane 35, then the fish would twist more during the cutting process.

Figure 11A:
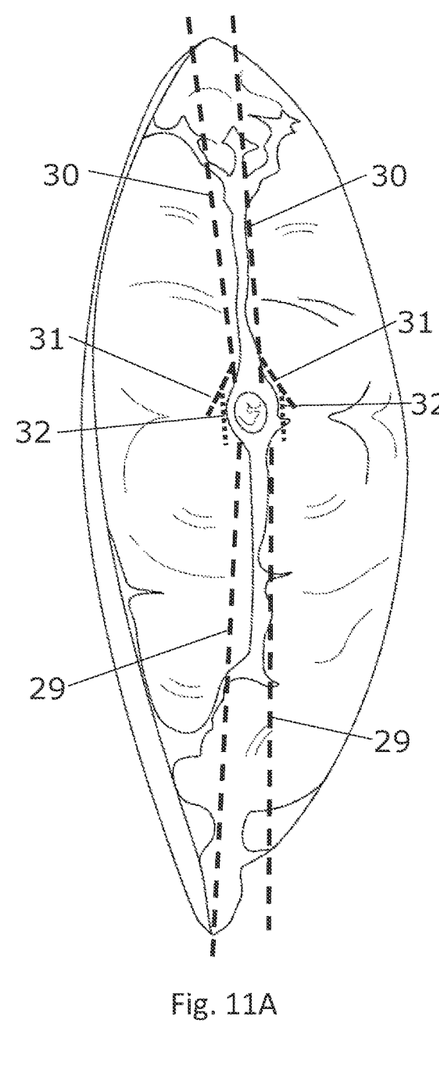
FIGS. 11A and 11B illustrate cross sections of non-filleted fish and indication of where the cuts are made during filleting the fish.
Figure 11B:
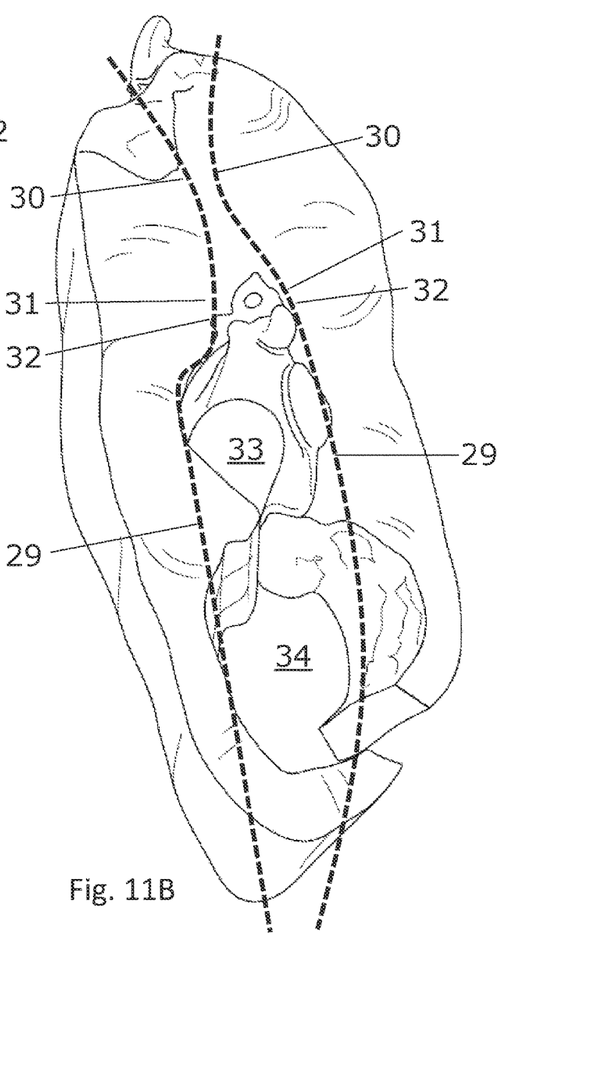

FIG. 11A and FIG. 11B illustrate cross sections of non-filleted fish and indication of where the cuts are made during filleting the fish. The dotted lines indicating where the fish is cut by the filleting machine are only illustrations indicating the overall positions of cutting lines, furthermore during the cutting process the fish is pressed in position such that e.g. the volumes of the swim bladder 33 and of the ventral cavity 34 are very small or absent and hereby the straight cuts made by the filleting machine can be made along the structures indicated in these figures. The fish section shown in FIG. 11A is from the caudal region of the fish and the fish section shown in FIG. 11B is from the Tilapia fish part with swim bladder 33 and ventral cavity 34 from where viscera is removed. In the figures the dorsal part of the fish is upward, and the ventral part is downward. The illustrated cuts are when fish are cut in a preferred embodiment of the fish filleting machine as illustrated in FIG. 5, and a preferred embodiment of the method for cutting fish in a fish filleting machine, where the fish are loaded head part first and dorsal part down in the in-feed. The ventral part of a fish is cut ($1^{st}$ cut 29) by the first set of cutting blades, the dorsal part of a fish is cut by the second ($2^{nd}$ cut 30) set of cutting blades and the ventral part of the vertebral column by a third ($3^{nd}$ cut 31) set of cutting blades. Hereafter the fish is cut ($4^{th}$ cut 32) on each side and laterally to the vertebral column by the fourth set of cutting blades.

Numbered Embodiments

Embodiment 1: A fish filleting machine for cutting fillets from fish, the machine comprising
  A feed-line for feeding fish through the machine,
  A first set of cutting blades for cutting the dorsal or the ventral part of the fish by cutting towards and along the vertebral column,
  A second set of cutting blades for cutting the dorsal or the ventral part of the fish not cut by the first set of cutting blades, by cutting towards and along the vertebral column,
wherein
  The first set of cutting blades and second set of cutting blades are located along the feed-line, and
  One of the first set of cutting blades or second set of cutting blades are located mainly above a plane extending through the filleting machine, and
  The other of the first set of cutting blades and the second set of cutting blades are located mainly below a plane extending through the filleting machine,
and wherein
  the first set of cutting blades and the second set of cutting blades are located in relation to each other such that
    the first set of cutting blades and the second set of cutting blades are not located directly horizontally above and below each other, and/or
    cutting parts of the first set of cutting blades and the second set of cutting blades cutting towards the vertebral column are not located directly horizontally above and below each other.

Embodiment 2: The machine according to embodiment 1, further comprising a third set of cutting blades for cutting the dorsal part of the fish along the vertebral column and next to the base of the neural spines.

Embodiment 3: The machine according to any of the preceding embodiments, further comprising a fourth set of cutting blades for cutting along the vertebral column of the fish, at the lateral sides of the vertebral column.

Embodiment 4: The machine according to any of the preceding embodiments, wherein the first set of cutting blades and the second set of cutting blades is each a set of two circular cutting blades located with one cutting blade on each side of the plane extending through the filleting machine.

Embodiment 5: The machine according to any of the preceding embodiments, wherein the third set of cutting blades is a set of scraper cutters located with one cutting blade on each side of the plane extending through the filleting machine.

Embodiment 6: The machine according to any of the preceding embodiments, wherein the fourth set of cutting blades is a set of two band saws located with one band saw on each side of the plane extending through the filleting machine.

Embodiment 7: The machine according to any of the preceding embodiments, wherein the first set of cutting blades is located before the second set of cutting blades.

Embodiment 8: The machine according to any of the preceding embodiments, wherein the first set of cutting blades is for cutting the ventral part of the fish, and the second set of cutting blades is for cutting the dorsal part of the fish.

Embodiment 9: The machine according to any of the preceding embodiments, wherein in the first set of cutting blades and/or in the second set of cutting blades the blades are positioned with an angle according to each other, such that the distance between the cutting blades is narrower
  a. in a first region which is substantially parallel to the plane extending through the filleting machine and which is facing a fish to be cut by the first set of cutting blades and/or the second set of cutting blades,
  b. in a second region which is located towards the vertebral column of a fish being processed, and
  c. in a third region located between the first region and the second region.

Embodiment 10: The machine according to any of the preceding embodiments, wherein the first, second, third and fourth set of cutting blades are fixed mounted.

Embodiment 11: The machine according to any of the preceding embodiments, further comprising a set of fin-cutting blades for cutting away the pelvic fin from a fish to be processed.

Embodiment 12: The machine according to embodiment 11, wherein the set of fin-cutting blades is movable mounted and configured to move towards a fish to cut through the fish skin along and on both sides of the pelvic fin, and to move away from the fish again after performing the cut.

Embodiment 13: The machine according to any of the preceding embodiments, wherein the plane extending through the filleting machine corresponds to the plane where the vertebral column of a fish being filleted on average passes through the machine.

Embodiment 14: A method of cutting fish in a fish filleting machine, the method comprising the steps of
  a. Obtaining fish which are decapitated and viscera is removed,
  b. Feeding the fish to a feed-line of a filleting machine,
  c. Cutting by a first set of cutting blades along the dorsal or ventral part of the fish, by cutting towards and along the vertebral column,
  d. Cutting by a second set of cutting blades along the dorsal or ventral part of the fish not cut by the first set of cutting blades by cutting towards and along the vertebral column,
Wherein the first set of cutting blades and second set of cutting blades are located relatively to each other such that the fish during the cutting by at least the first set of cutting blades becomes twisted upwards or downwards.

Embodiment 15: The method according to embodiment 14, further comprising cutting by a third set of cutting blades the dorsal part of the fish along the vertebral column and next to the base of the neural spines.

Embodiment 16: The method according to any of the embodiments 14 to 15, further comprising cutting by a fourth set of cutting blades along the vertebral column of the fish, at the lateral sides of the vertebral column.

Embodiment 17: The method according to any of the embodiments 14 to 16, wherein the dorsal side of the fish is cut before the ventral side of the fish is cut.

Embodiment 18: The method according to embodiment 17, wherein cutting the ventral side of the fish is initiated before cutting the dorsal side of the fish is finished.

Embodiment 19: The method according to any of the embodiments 14 to 18, wherein cutting the ventral side of the fish and the dorsal side of the fish is not initiated simultaneously.

Embodiment 20: The method according to any of the embodiments 14 to 19, wherein during the cutting of the ventral side of the fish, the ribs are cut off the vertebral column.

Embodiment 21: The method according to any of the embodiments 14 to 20 wherein the twisted fish during the cutting process becomes re-twisted back to a lateral position substantially similar to before initiating the twisting.

Embodiment 22: The method according to any of the embodiments 14 to 21, wherein the pelvic fin is cut off the fish prior to being cut by the first set of cutting blades.

Embodiment 23: The method according to any of the embodiments 14 to 22, wherein the cuttings performed by the first and second sets of cutting blades are performed with angled cutting blades in each set of cuttings blades and which cutting blades are narrowed towards each other in the cutting region of the blades.

Embodiment 24: The method according to any of the embodiments 15 to 23, wherein cutting by the third set of cutting blades is a scraper cutting to cut away the meat from the vertebral column.

Embodiment 25: The method according to any of the embodiments 16-24, wherein the cut performed by the fourth set of cutting blades is performed by a band saw.

The invention claimed is:

1. A fish filleting machine for cutting fillets from fish, the machine comprising:
  a feed-line for feeding fish through the machine,
  a first set of cutting blades for cutting a dorsal or a ventral part of the fish by cutting towards and along a vertebral column,
  a second set of cutting blades for cutting the dorsal or the ventral part of the fish not cut by the first set of cutting blades, by cutting towards and along the vertebral column, wherein
  the first set of cutting blades and the second set of cutting blades are located along the feed-line, and
  one of the first set of cutting blades or the second set of cutting blades are located mainly above a horizontal plane extending through the filleting machine, and
  the other of the first set of cutting blades and the second set of cutting blades are located mainly below the horizontal plane extending through the filleting machine,
  wherein the first set of cutting blades and the second set of cutting blades are located in relation to each other such that the first set of cutting blades and the second set of cutting blades are not located directly above and below each other, and the first set of cutting blades and the second set of cutting blades are located with a distance of less than 45 mm between the cutting blades of the first set of cutting blades and the cutting blades of the second set of cutting blades, and
  wherein the first set of cutting blades and the second set of cutting blades are located relatively to each other such that, during the cutting by at least the first set of cutting blades, the fish becomes twisted upwards and/or downwards.

2. The machine according to claim 1, further comprising a third set of cutting blades for cutting the dorsal part of the fish along the vertebral column and next to a base of the neural spines.

3. The machine according to claim 2, further comprising a fourth set of cutting blades for cutting along the vertebral column of the fish, at lateral sides of the vertebral column.

4. The machine according to claim 3, wherein the fourth set of cutting blades is a set of two band saws located with one band saw on each side of the plane extending through the filleting machine.

5. The machine according to claim 2, wherein the third set of cutting blades is a set of scraper cutters located with one cutting blade on each side of the plane extending through the filleting machine.

6. The machine according to claim 1, wherein the first set of cutting blades and the second set of cutting blades each is a set of two circular cutting blades located with one cutting blade on each side of the plane extending through the filleting machine.

7. The machine according to claim 1, wherein the first set of cutting blades is located upstream of the second set of cutting blades.

8. The machine according to claim 1, wherein the first set of cutting blades is for cutting the ventral part of the fish, and the second set of cutting blades is for cutting the dorsal part of the fish.

9. The machine according to claim 1, further comprising a pelvic fin cutter located upstream of the first set of cutting blades.

10. The machine according to claim 9, wherein the pelvic fin cutter comprises at least one cutting edge, such as a single circular cutting blade with an outer cutting edge, for splitting a pelvic fin of a fish or for cutting a connection between two pelvic fins of a fish.

11. The machine according to claim 9, further comprising an actuator in communication with the pelvic fin cutter, and
  wherein the actuator is capable of locating and de-locating at least a part of the pelvic fin cutter in a cutting position.

12. The machine according to claim 11, further comprising a controller for controlling the actuator, such as for controlling the pelvic fin cutter according to the location of a fish to be cut relative to the pelvic fin cutter, such that the pelvic fin cutter is activated and at least one cutting edge of the pelvic fin cutter a pelvic fin or a connection between pelvic fins of a fish transported along the feed-line and passing the pelvic fin cutter.

13. The machine according to claim 1, wherein in the first set of cutting blades and/or in the second set of cutting blades the blades are positioned with an angle according to each other, such that the distance between the cutting blades is narrower
   a. in a first region which is substantially parallel to the plane extending through the filleting machine and which is facing a fish to be cut by the first set of cutting blades and/or the second set of cutting blades,
   b. in a second region which is located towards the vertebral column of a fish being processed, and
   c. in a third region located between the first region and the second region.

14. A method of cutting fish in a fish filleting machine including a feed-line for feeding fish through the machine, a first set of cutting blades for cutting a dorsal or a ventral part of the fish by cutting towards and along a vertebral column, a second set of cutting blades for cutting the dorsal or the ventral part of the fish not cut by the first set of cutting blades, by cutting towards and along the vertebral column, the method comprising the steps of:
   a. obtaining fish which are decapitated and viscera is removed,
   b. feeding the fish to the feed-line of the filleting machine,
   c. cutting by the first set of cutting blades along the dorsal or the ventral part of the fish, by cutting towards and along the vertebral column,
   d. cutting by the second set of cutting blades along the dorsal or ventral part of the fish not cut by the first set of cutting blades by cutting towards and along the vertebral column,
   wherein the first set of cutting blades and the second set of cutting blades are located along the feed-line, and one of the first set of cutting blades or the second set of cutting blades are located mainly above a horizontal plane extending through the filleting machine, and the other of the first set of cutting blades and the second set of cutting blades are located mainly below the horizontal plane extending through the filleting machine,
   wherein the first set of cutting blades and the second set of cutting blades are located in relation to each other such that the first set of cutting blades and the second set of cutting blades are not located directly above and below each other, and the first set of cutting blades and the second set of cutting blades are located with a distance of less than 45 mm between the cutting blades of the first set of cutting blades and the cutting blades of the second set of cutting blades, and
   wherein the first set of cutting blades and the second set of cutting blades are located relatively to each other such that the fish during the cutting by at least the first set of cutting blades becomes twisted upwards and/or downwards.

15. The method according to claim 14, wherein the method further comprising a step between step b and step c, said step comprising splitting a pelvic fin of the fish or cutting a connection between two pelvic fins of the fish.

* * * * *